(12) United States Patent
Lamba

(10) Patent No.: US 8,781,505 B2
(45) Date of Patent: Jul. 15, 2014

(54) LOCATION DETERMINATION OF MOBILE DEVICE

(75) Inventor: Gaurav Lamba, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 12/201,152

(22) Filed: Aug. 29, 2008

(65) Prior Publication Data

US 2010/0056185 A1 Mar. 4, 2010

(51) Int. Cl.
*H04W 24/00* (2009.01)
(52) U.S. Cl.
USPC .......... 455/456.6; 455/456.1; 455/456.5; 455/441; 455/456.3
(58) Field of Classification Search
USPC ............ 455/456.1, 456.2, 456.3, 456.6, 441
See application file for complete search history.

(56) References Cited

U.S. PATENT DOCUMENTS

| | | | | |
|---|---|---|---|---|
| 6,330,446 | B1 * | 12/2001 | Mori | 455/435.2 |
| 6,748,224 | B1 * | 6/2004 | Chen et al. | 455/456.1 |
| 7,822,427 | B1 * | 10/2010 | Hou | 455/456.2 |
| 8,000,719 | B1 * | 8/2011 | Lambert | 455/456.1 |
| 2002/0014990 | A1 * | 2/2002 | Kimura | 342/458 |
| 2003/0125044 | A1 * | 7/2003 | Deloach et al. | 455/456 |
| 2006/0009235 | A1 * | 1/2006 | Sheynblat et al. | 455/456.1 |
| 2006/0135067 | A1 * | 6/2006 | Dunko | 455/41.2 |
| 2007/0021121 | A1 * | 1/2007 | Lane et al. | 455/441 |
| 2007/0021122 | A1 * | 1/2007 | Lane et al. | 455/441 |
| 2007/0213082 | A1 * | 9/2007 | Ryu et al. | 455/466 |
| 2007/0275734 | A1 * | 11/2007 | Gaal et al. | 455/456.6 |

FOREIGN PATENT DOCUMENTS

| | | | | |
|---|---|---|---|---|
| EP | 0935227 | A2 | 8/1999 | |
| JP | EP 1768280 | * | 3/2007 | G01S 1/00 |
| WO | WO02080606 | A1 | 10/2002 | |
| WO | WO2005071894 | A1 | 8/2005 | |

OTHER PUBLICATIONS

Taiwan Search Report—TW098129100—TIPO—Aug. 23, 2012.
"Cellular Telephone With Over-The Air Software Download Capability Disclosed by Ericsson Inc", IBM Technical Disclosure Bulletin, US, vol. 41, No. 1, Jan. 1, 1998, p. 263, XP000772100 ISSN: 0018-8689.
Drane C et al: "Positioning GSM Telephones" IEEE Communications Magazine, IEEE Service Center, Piscataway, US, vol. 36, No. 4, Apr. 1, 1998, pp. 46-54,58, XP000752570 ISSN: 0163-6804 p. 50, right-hand col.—p. 52, left-hand col.
International Search Report and Written Opinion—PCT/US2009/055364—ISA/EPO—Jan. 27, 2010.
Nico Deblauwe et al., "Combining GPS and GSM Cell-ID positioning for Proactive Location-based Services" Mobile and Ubiquitous Systems: Networking & Services, 2007. Mobiquitous 2007. Fourth Annual International Conference on, IEEE, Piscataway, NJ, USA, Aug. 6, 2007, pp. 1-7, XP031230267 ISBN: 978-1-4244-1024-8.

(Continued)

*Primary Examiner* — Danh Le
(74) *Attorney, Agent, or Firm* — Thien T. Nguyen

(57) ABSTRACT

The subject matter disclosed herein relates to determining a location fix of a mobile station based on identification information of a cellular base station included in a pilot signal.

16 Claims, 5 Drawing Sheets

(56) References Cited

OTHER PUBLICATIONS

Samsung: "BCCH content delivery mechanism" 3GPP Draft; R2-061883, 3rd Generation Partnership Project ( 3GPP ) , Mobile Competence Centre ; 650, Route Des Lucioles ; F-06921 Sophia-Antipolis Cedex ; France, vol. RAN WG2, No. Cannes, France; 20060621, Jun. 21, 2006, XP050141918 [retrieved on 2006-06-211 chapter 2. Discussion (SIB15: Positionign info ).

Tomislav Kos et al., "Mobile User Positioning in GSM/UMTS Cellular Networks" Multimedia Signal Processing and Communications, 48th International Symposium ELMAR-2006 Focused on, IEEE, PI , Jun. 1, 2006, pp. 185-188, XP031058375 ISBN: 978-953-7044-03-9 p. 185, right-hand col.—p. 187, right-hand col.

* cited by examiner

2007 Apr 16    18:50:18.261 [30]    0x1007 Paging
Channel Message - System Parameter Msg
protocol_rev = 6 (IS2000 Rev 0)
chan_type = 1 (Paging)
chan
  pc_msg
    gen
      prot_disc = 0
      msg_id = 1 (System Parameters)
    sysparm ─ 220
      pilot_pn = 183 (0xb7) (11712 PN chips)
      config_msg_seq = 2
      sid = 14844 (0x39fc)         ─ 210
      nid = 7001 (0x1b59)
      reg_zone = 7 (0x7)
      total_zones = 2 (unknown)
      zone_timer = 1 (2 Minutes)
      mult_sids = 1
      mult_nids = 1
      base_id = 12089 (0x2f39)
      base_class = 0 (Public Macrocellular System)
      page_chan = 1
      max_slot_cycle_index = 1
      home_reg = 1
      for_sid_reg = 1
      for_nid_reg = 1
      power_up_reg = 1
      power_down_reg = 1
      parameter_reg = 0
      reg_prd = 66 (74:4.48 Seconds)                                    ─ 230
      base_lat = 273401 (0x42bf9) (18°59'10.25"N)
      base_long = 1048850 (0x100112) (72°50'12.50"E)
      reg_dist = 0 (0x0) (Distance Based Registration DISABLED)
      srch_win_a = 8 (60 PN Chips)
      srch_win_n = 6 (28 PN Chips)
      srch_win_r = 7 (40 PN Chips)
      nghbr_max_age = 0
      pwr_rep_thresh = 2
      pwr_rep_frames = 9 (113 Frames)
      pwr_thresh_enable = 1
      pwr_period_enable = 0
      pwr_rep_delay = 1
      rescan = 0
      t_add = 26
      t_drop = 30
      t_comp = 8
      t_tdrop = 3
      ext_sys_parameter = 1
      ext_nghbr_list = 0
      gen_nghbr_list = 0
      global_redirect = 0
      is2000_incl = 1
      pri_nghbr_list = 0
      user_zone_id = 0
      ext_global_redirect = 0
      ext_chan_list = 1
      is2000_relC_incl = 1
      t_tdrop_range_incl = 0
      is2000_relD_incl = 1
      neg_slot_cycle_index_sup = 0

LOCATION DETERMINATION OF MOBILE DEVICE

BACKGROUND

1. Field

The subject matter disclosed herein relates to determining a location fix of a mobile station based on identification information of a cellular base station included in a pilot signal.

2. Information

A satellite positioning system (SPS), such as the Global Positioning System (GPS), typically comprises a system of earth orbiting satellite vehicles (SVs) enabling wireless devices such as cellular telephones, personal communication system (PCS) devices, and other mobile stations (MSs), to determine their location on the earth based, at least in part, on signals received from the SVs. Such wireless devices may be equipped with an SPS receiver and be capable of processing SV signals to determine location. However, a relatively large portion of existing wireless devices may lack an SPS receiver and a capability to determine their location based on receipt of SPS signals.

BRIEF DESCRIPTION OF THE FIGURES

Non-limiting and non-exhaustive features will be described with reference to the following figures, wherein like reference numerals refer to like parts throughout the various figures

FIG. 2 is an example of a system parameter message, according to an implementation.

SUMMARY

Figure 1:
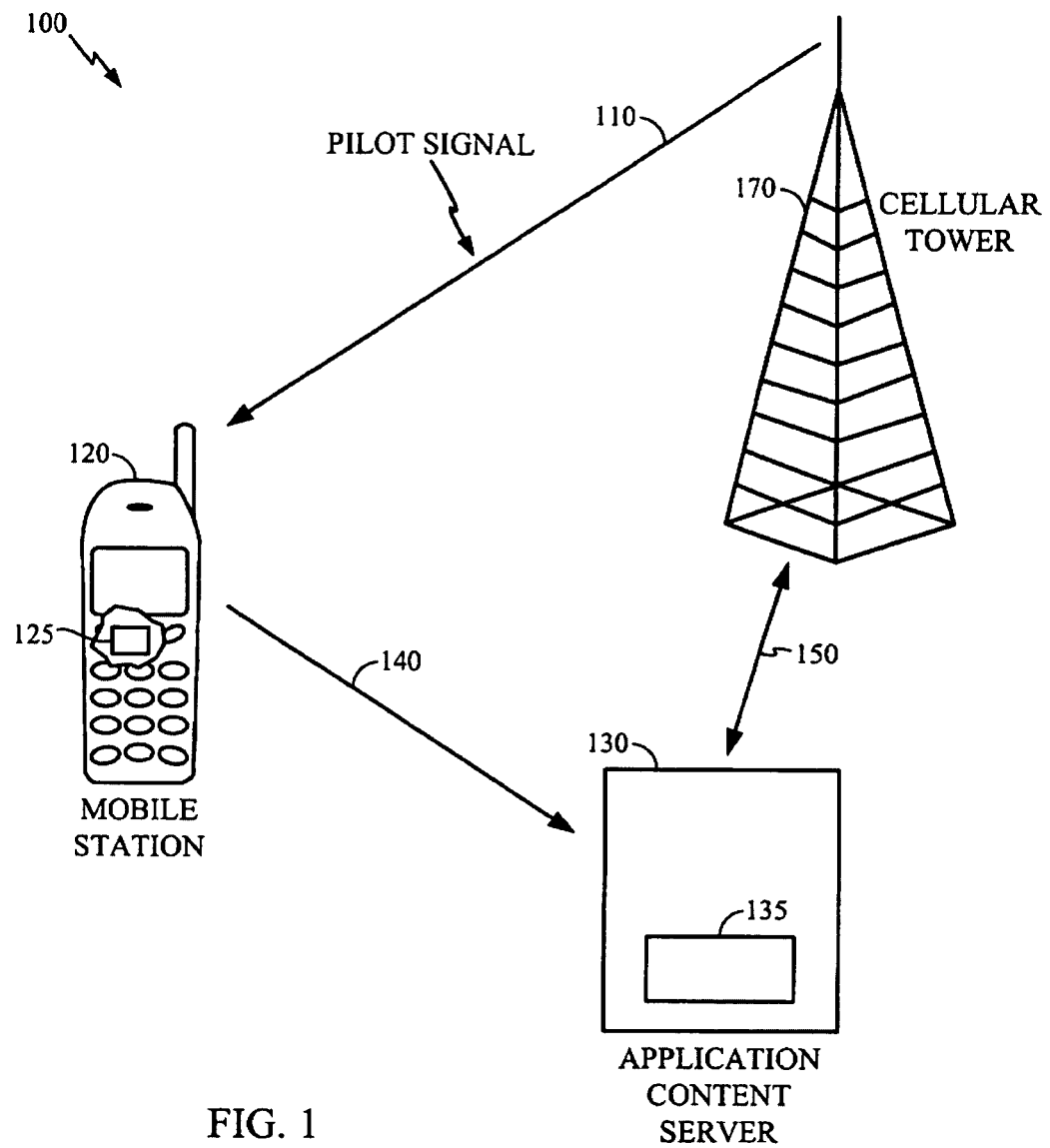
FIG. 1 is a schematic diagram of a positioning system, according to an implementation.

In an implementation, a device, such as a mobile station is enabled to receive a pilot signal from a cellular base station, wherein said mobile station may be adapted to determine a location fix based on identification information included in the pilot signal. It should be understood, however, that this is merely an example of a particular implementation, and that claimed subject matter is not limited to this particular example.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or software implementation, methodologies may be implemented with modules (e.g., procedures, functions, and so on) that perform the functions described herein. Any machine-readable medium tangibly embodying instructions may be used in implementing the methodologies described herein. For example, software codes may be stored in a memory, for example the memory of a mobile station, and executed by a processor. Memory may be implemented within the processor or external to the processor. As used herein the term "memory" refers to any type of long term, short term, volatile, nonvolatile, or other memory and is not to be limited to any particular type of memory of number or memories, or type of media upon which memory is stored.

Position determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2), 3GPP and 3GPP2 documents are publicly available. A WLAN may comprise an IEEE 802.11x network, and a WPAN may comprise a Bluetooth network, an IEEE 802.15x, for example. Such position determination techniques described herein may also be used for any combination of WWAN, WLAN and/or WPAN.

Handheld systems, including cell phones, or an entity such as a mobile station (MS) for example, may comprise a receiver capable of receiving and processing SPS signals. However, receiving and processing hardware may add cost to such systems. Techniques and processes shown herein allow location services without processing SPS signals, enabling inexpensive handsets to provide location services.

In one particular implementation, a location service may include a location fix of an entity such as an MS. A location fix may provide geographic information, such as latitude and longitude, a geographical map, and/or any information that may convey a location and/or position of an MS. A location fix may include relative location information, wherein a location is provided in terms relative to another location, such as a location of a landmark, a region, a marketplace, a cellular tower, an airport, a second mobile station, and a previous location fix, just to name a few examples.

An entity such as an MS may communicate with a network, operated by a wireless service provider, for example. Such an MS may comprise a cellular telephone, a personal digital assistant (PDA), or a notebook computer, just to name a few examples. In one aspect of a wireless communication network, data may be requested and exchanged among entities operating in the network. For example, an MS may receive data from a wireless communication network to determine the position of the MS operating within the network. However, these are merely examples of data exchange between an MS and a network in a particular aspect, and claimed subject matter is not limited in these respects.

An MS may communicate with any number of cellular base stations. Each base station may provide communication for a respective coverage area or cell. The term "cell" may refer to a base station and/or its coverage area. To increase system capacity, a coverage area of a base station may be partitioned into sectors. The term "base station" as used herein may refer to a base station that serves a cell and/or a base station that serves a sector.

An MS may include a capability to determine its location using SPS signals, such as in the Global Positioning System (GPS) and/or other global navigation satellite systems. However, a large portion of mobile stations lack any capability to process SPS signals. Such devices may determine a location without processing such SPS signals, according to implementation. For example, an MS, which lacks an ability to process SPS signals, may communicate with a cellular base station, such as a cell tower, while it is within a "cell" of the cell tower. A portion of this communication may include a pilot signal, described in further detail below, transmitted by the cell tower. The pilot signal may include identification of the transmitting cell tower. Such identification may include latitude/longitude of the cell tower and/or an identification code of the cell tower and a wireless carrier. In one aspect, an MS may include a resident application that may identify and extract cell tower identification from the pilot signal. If the cell tower identification includes latitude/longitude of the cell tower, for example, then the MS may determine its position by extracting such identification from the pilot signal. The determined position may be that of the cell tower, but the location of the MS may be known to be somewhere within the coverage area of the cell tower, or the uncertainty region. The accuracy of this method of determining the approximate MS position may depend in part on the cell size, or coverage area, which may range between two kilometers and thirty two kilometers in radius, for example. Accordingly, at least within a limited uncertainty, an MS, which lacks a GPS positioning ability, may nevertheless determine its position using a pilot signal.

In another aspect, the cell tower identification may not include latitude/longitude of a cell tower, but instead include an identification code of a cell tower and a wireless carrier. In such a case, an MS may include a look-up table that includes identification codes of cell towers and information associated with their respective geographical locations, for example. Geographical information may include latitude and longitude of a cell tower, or other information which represents the cell tower location. In one implementation, a look-up table may be stored in a memory of a computer platform included in an MS, which will be described below in relation with FIG. 5. Accordingly, the MS may determine its position by extracting cell tower identification from the pilot signal and using a look-up table to find a corresponding location of the cell tower. Again, the determined position may be that of the cell tower, but the MS may be assumed to be relatively nearby, at least within the cell tower's "cell".

In yet another aspect, as in the case described above, the cell tower identification may not include latitude/longitude of a cell tower, but instead include an identification code associated with the cell tower. In such a case, an application content server (ACS), which may be remote from an MS, may include a look-up table associating identification codes of cell towers and their respective geographical locations, for example. In one implementation, such a look-up table may be stored in a memory of a computer platform included in a the ACS. Accordingly, the MS may determine a location fix by extracting cell tower identification from the pilot signal and transmitting such extracted information to an ACS. Here, the ACS may use a look-up table to find a corresponding location of the cell tower. The ACS may then transmit cell tower location back to the MS. Again, the determined position may be that of the cell tower, but the MS may be assumed to be relatively nearby, at least within the cell tower's "cell". Of course, this is merely one implementation of a process for determining a location fix, and claimed subject matter is not so limited, which is only described here to help illustrate various implementations.

FIG. 1 is a schematic diagram of a positioning system 100, according to an implementation. MS 120 may be enabled to receive pilot signal 110 from cellular base station 170. Such a pilot signal is well-known in the art, and may be dictated by IS-95A, IS 2000, and J-STD-008 standards, for example. Cellular base station 170 may comprise a code division multiple access (CDMA) radio access network (RAN). A pilot signal, which may be carrier modulated by a pseudonoise (PN) sequence, may be used for time synchronization, handoff among cellular base stations, and provision of a coherent reference, to name a few examples. A pilot signal may include a system parameters message (SPM), which will be explained in detail below with reference to FIG. 2.

Through a cellular base station, such as cellular base station 170 in FIG. 1, a wireless carrier may provide a variety of services to an MS user, or subscriber. Communication between a cellular base station and an MS may provide a wireless link that a subscriber may use to download different applications, depending on a service to which the subscriber chooses. Such applications may then be stored in a memory associated with a computing platform of an MS, as will be explained below. For example, a subscriber may choose one or more of many types of location services. Each such service may provide a different level of quality and/or a different subscription rate plan, just to name a few examples of what may be offered by a wireless carrier. Examples of services may also include voice, email, text messaging, and internet browsing.

MS 120 may include an application module 125 comprising an application that allows MS 120 to identify and extract identification information of said cellular base station included in a received pilot signal. Such an application may be based on, for example, binary runtime environment for wireless (BREW) software, which is a platform that can download and run small programs for playing games, sending messages, sharing photos, etc. BREW may run between the application and the mobile station's chip operating system. Other software platforms may be used, including JAVA™ and WINDOWS®, just to name a few examples. Such an application of other related information may be downloaded, for example, from a wireless network via short message service (SMS) communications protocol. A downloaded application may be provided by a wireless carrier as an add-on feature for a service provided by a wireless carrier. In other words, an MS user may desire services in addition to those to which the user presently subscribes. In such a case, a user may subscribe to additional services offered by a wireless carrier. The additional services may involve downloading an application from the wireless carrier via a cellular base station to an MS. In one implementation, such a process of communication may also include updating applications already stored in a memory associated with an MS. In another implementation, such a process of communication may involve executing an application stored in a memory associated with an MS remotely from a third-party entity on the wireless network, such as another mobile station. For example, a user of one MS may execute an application to determine a location fix of a second MS, wherein such an application may be resident on the second MS. Accordingly, this enables a wireless carrier and/or service provider to provide location and/or position determination service to subscribers using inexpensive devices (e.g., cellular handsets) that do not have the ability to acquire/process SPS signals.

In one implementation, base station identification information (BSID) may be transmitted via path 140 to an application content server (ACS) 130. In another implementation, MS 120 may communicate with ACS 130 to transmit BSID via cellular base station 170, as indicated by path 150 in FIG. 1. Such transmission may be performed via a short message service (SMS) communications protocol or via a Packet Data call (over IS2000/GPRS/UMTS or wireless LAN), just to name a few examples. ACS 130 may use the BSID to determine applicable location sensitive content that may be transmitted back to MS 120. In a particular implementation, ACS may include, or have access to, a data base 135 of location sensitive content, such as cellular base station locations, geographical maps, business locations, advertisements, travel directions based on current location, location-based coupons, and/or points of interest, just to name a few examples. Such a database may also include a look-up table, for example, that includes base station ID's and their respective geographical locations. MS 120 may use location sensitive content to determine a location fix.

In one aspect, MS 120 may determine its location from BSID, which may comprise a portion of a pilot signal, as discussed above. FIG. 2 is an example of a system parameter message (SPM) 200, according to one implementation. Such an SPM may be included in a pilot signal, such as pilot signal 110 shown in FIG. 1. SPM 200 may include information regarding a cellular base station, such as cellular base station 170 shown in FIG. 1. For example, system ID code 220 and base station ID 210 may uniquely identify a cellular base station. Using such a unique base station ID, an application content server, such as ACS 130 shown in FIG. 1, may determine a location of the base station according to a data base, such as data base 135 shown in FIG. 1. In another example, an MS may determine a location of a cellular base station using base station location 230, which may be included in a pilot signal from the cellular base station.

Base station ID (BSID), such as BSID shown in FIG. 1, may include system ID code 220, base station ID 210, and base station location 230, for example. As discussed above, an MS may extract BSID from a pilot signal from a particular cellular base station. Since the BSID may provide a location of the cellular base station with which the MS is communicating, a location of the MS may be determined, considering that a cellular base station and MS are close enough to each other to enable the MS to acquire the pilot signal.

If an MS changes location enough so that it begins to use a different cellular base station, then a pilot signal, including an SPM, may change accordingly. The new SPM may include a new BSID including the new cellular base station location. In this fashion, an MS may determine its location, as it is within a "cell" of the cellular base station.

As explained above, an MS may determine its location by extracting location information included in a pilot signal transmitted by a cellular base station. Accordingly, such an MS may not include a satellite positioning system (SPS) receiver, for example, since a location fix of the MS may be based solely on the pilot signal.

In an alternative implementation, an MS may include an SPS receiver. Such an MS may determining location fixes based, at least in part, on said SPS signals. In one aspect, an MS may be enabled to transition from determining location fixes based, at least in part, on said SPS signals to determining location fixes based solely on said pilot signal. Such a transition may occur, for example, if SPS signals are less than adequate to provide enough information to determine a location of the MS. For instance, an urban canyon or indoor conditions may block a mobile station's "view" of one or more SPS satellites. For whatever reason, the MS may transition away from determining its location using SPS signals. Instead, the MS may use a pilot signal received from a cellular base station to determine its location.

Figure 3:
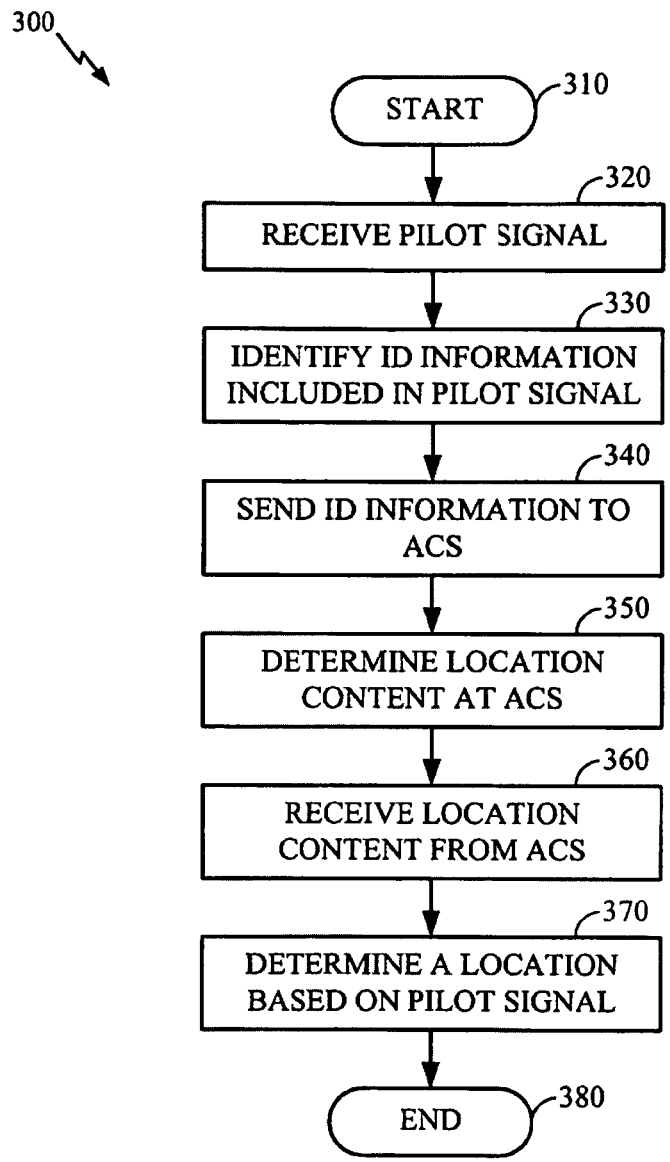
FIG. 3 is a flow chart showing a process for determining a location, according to an implementation.

FIG. 3 is a flow chart showing a process 300 for determining a location, according to one implementation. At block 320, an MS, such as MS 120 shown in FIG. 1, may receive a pilot signal. As described above, a pilot signal may include location information and/or other identification of a cellular base station. An MS, as depicted at block 330, may identify such location and/or identification, such as BSID shown in FIG. 1. At block 340, an MS may transmit BSID to an application content server, such as ACS 130 shown in FIG. 1. At block 350, ACS may determine location content regarding the cellular base station with which the BSID is associated. Such location content may include a location of the cellular base station or geographic points of interest, just to name a few examples. At block 360, the MS may receive location sensitive content transmitted by the ACS. As depicted at block 370, the MS may determine its location based on the received location sensitive content, which may be based on the pilot signal mentioned above.

In another implementation, processes depicted at blocks 340, 350, and 360 may be skipped while performing the process 300. For example, an MS may extract cellular base station location information, such as base station location 230 shown in FIG. 2, from a pilot signal. Such information may be sufficient to enable the MS to determine its location, since the MS may be relatively close to, and within the "cell" of said cellular base station. In another implementation, a pilot signal may not include base station location. In such a case, an MS may include a look-up table that includes identification codes of cell towers and their respective geographical locations, for example. Accordingly, the MS may determine its position by extracting cell tower identification from the pilot signal and using a look-up table to find a corresponding location of the cell tower.

As just described, determining a location of an MS may not involve an ACS. If, however, as in yet another implementation, a pilot signal does not include base station location and an MS does not include a look-up table as described above. Then processes depicted at blocks 340, 350, and 360 may be performed. In this case, an ACS may be utilized to determine base station location using base station ID, such as base station ID 210 shown in FIG. 2. The MS may send a base station ID to an ACS (block 340). ACS may then access a look-up table, for example, that includes base station ID's and their respective geographical locations (block 350). Such location information may then be transmitted to the MS (block 360). Of course, these processes are only examples, and claimed subject matter is not limited in this respect.

Figure 4:
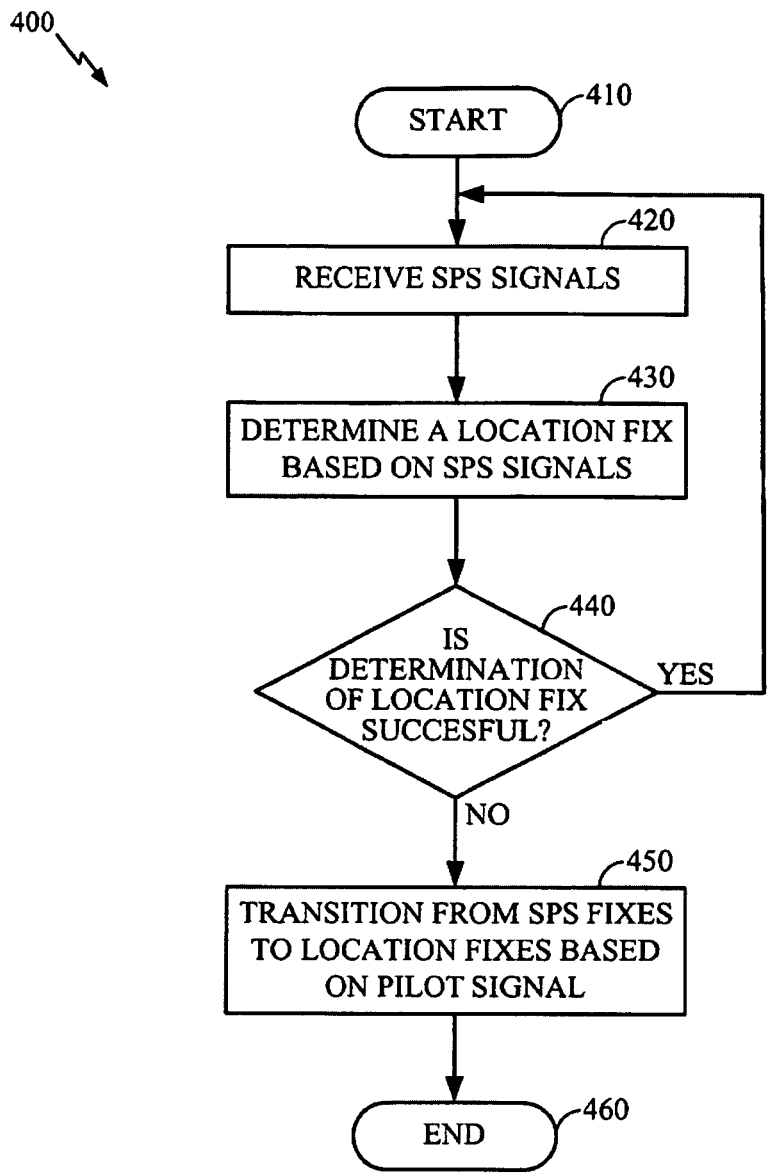
FIG. 4 is a flow chart showing a process for determining a location, according to another implementation.

FIG. 4 is a flow chart showing a process 400 for determining a location, according to another implementation. At block 420, an MS equipped with an SPS receiver may receive SPS signals. Such an MS may also be enabled to determine its location based on received SPS signals, as depicted at block 430. At block 440, process 400 returns to block 420 to continue to receive SPS signals if determination of MS location based on said SPS signals is successful. If unsuccessful, however, the MS may transition from determining location fixes based on SPS signals to determining location fixes based solely on identification information included in a pilot signal, as at block 450. An MS may receive a pilot signal as long as it is within a "cell" of a cellular base station. Often, it is more likely that an MS may "see" a cellular base station rather than "see" a sufficient number of satellites to determine a location fix. Accordingly, such a transitioning MS may continue to determine location fixes during conditions that prevent reception of SPS signals.

Figure 5:
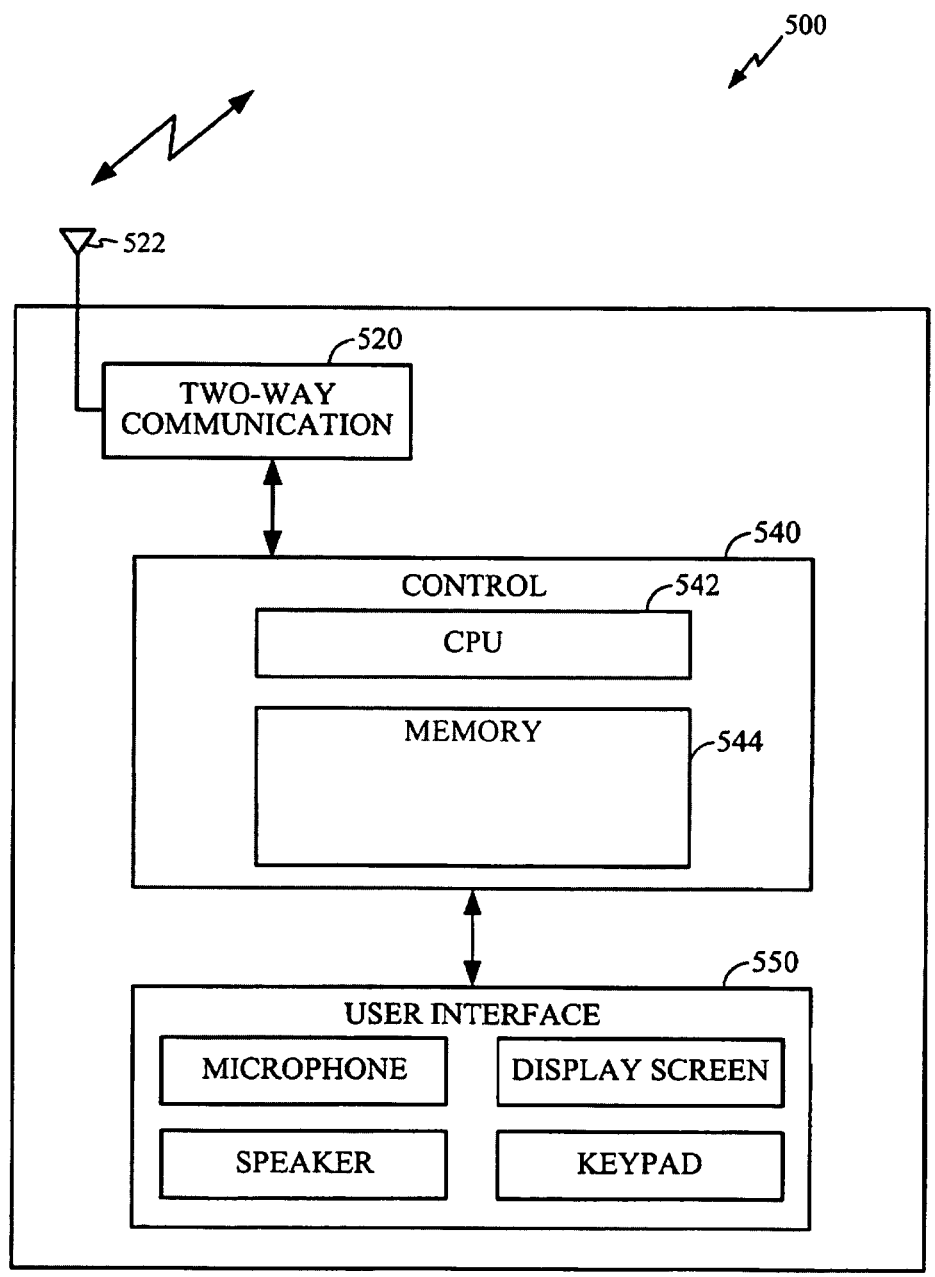
FIG. 5 is a schematic diagram of a device capable of communication with a wireless network, according to an implementation.

FIG. 5 is a schematic diagram of a device 500 capable of communication with a wireless network, according to one implementation. Such a device may include an MS, such as MS 120 shown in FIG. 1, for example. Device 500 may include a two-way communication system 520, such as but not limited to a cellular communication system, which may transmit and receive signals via antenna 522. The communication system 520 may include a modem adapted to process information for communication in one or more of the aforementioned networks. In one alternative implementation, device 500 may include a position location system, such as a Satellite Positioning System (SPS) receiver to receive SPS signals. The modem and SPS receiver may communicate with one another, and such communication may include, for example, the cellular identification of the device, estimates of time and/or location, frequency, or other radio information. In another implementation, device 500 may not include a position location system, so that the device lacks any inherent ability to acquire SPS signals.

Mobile control 540 may comprise a central processing unit (CPU) 542 and associated memory 544, hardware, software, and firmware. It will be understood as used herein that the CPU 542 can, but need not necessarily include, one or more microprocessors, embedded processors, controllers, application specific integrated circuits (ASICs), digital signal processors (DSPs), and the like. The term CPU is intended to describe the functions implemented by the system rather than specific hardware. In an alternative embodiment memory 544 may include a look-up table, as discussed above. Memory 544 may store machine-readable instructions which, if executed by CPU 542, may enable device 500 to determine its location, as in at least the implementations described above. Such machine-readable instructions may be downloaded, e.g., received via two-way communication 520, from a remote entity such as a wireless carrier, for example. Machine-readable instructions may include an application, such as application module 125 shown in FIG. 1, that allows device 500 to identify and extract identification information of a cellular base station included in a pilot signal. Such an application may also include a look-up table of cellular base station information for a region or the world. Of course, claimed subject matter is not limited to these examples, which are only described here to help illustrate various implementations.

Memory 544 may comprise one or more types of storage media identified above. A user interface 550 may allow a user to enter information into and receive information, such as voice or data, from device 500. The user interface 550 may include, for example, a keypad, a display screen, a microphone, and a speaker.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
    detecting an instruction sent from a first mobile station to a second mobile station to execute a position determination application stored on a memory of the second mobile station;
    obtaining, at the second mobile station, a pilot signal comprising identification information associated with a base station;
    in response to detecting the instruction, extracting identification information of the base station from the pilot signal;
    obtaining a location of the base station from a look-up table (LUT) stored in a memory of the second mobile station using the identification information of the base station, wherein the LUT includes information about identification of a plurality of base stations and their corresponding locations in a region; and
    determining a location fix for the second mobile station based on the location of the base station obtained from the LUT.

2. The method of claim 1, wherein the identification information comprises at least one of a pilot pseudo-random noise sequence, a system identification, or a network identification.

3. The method of claim 1, wherein determining the location fix for the second mobile station comprises:
    designating the location of the base station obtained from the LUT as an approximate location of the second mobile station; and
    determining an uncertainty associated with the approximate location of the second mobile station based on a radius of a coverage area of the base station.

4. The method of claim 1, wherein the location of the base station comprises latitude and longitude of the base station.

5. A mobile station, comprising:
    a receiver configured to obtain a pilot signal comprising identification information associated with a base station;
    a memory storing instructions;
    a processor configured to execute the instructions, wherein the instructions are configured to cause the processor to:
        detect an instruction originating from another mobile station to execute a location determination application;
        extract identification information of the base station from the pilot signal in response to detecting the instruction;
        obtain a location of the base station from a look-up table (LUT) stored in the memory of the mobile station using the identification information of the base station, wherein the LUT includes information about identification of a plurality of base stations and their corresponding locations in a region; and determine a location fix for the mobile station based on the location of the base station obtained from the LUT.

6. The mobile station of claim 5, wherein the identification information comprises at least one of a pilot pseudo-random noise sequence, a system identification, or a network identification.

7. The mobile station of claim 5, wherein the instructions are further configured to cause the processor to:

designate the location of the base station obtained from the LUT as an approximate location of the mobile station; and determine an uncertainty associated with the approximate location of the mobile station based on a radius of a coverage area of the base station.

8. The mobile station of claim 5, wherein the location of the base station comprises latitude and longitude of the base station.

9. An article comprising a storage medium comprising machine-readable instructions that, when executed by a computing platform of a mobile station, cause the computing platform to:

detect an instruction to execute a location determination application originating from another mobile station;

obtain, at the mobile station, a pilot signal comprising identification information associated with a base station;

extract identification information of the base station from the pilot signal in response to the instruction to execute the location determination application;

obtain a location of the base station from a look-up table (LUT) stored in a memory of the mobile station using the identification information of the base station, wherein the LUT includes information about identification of a plurality of base stations and their corresponding locations in a region; and determine a location fix for the mobile station based on the location of the base station obtained from the LUT.

10. The article of claim 9, wherein the identification information comprises at least one of a pilot pseudo-random noise sequence, a system identification, or a network identification.

11. The article of claim 9, wherein the instructions further cause the computing platform to:

designate the location of the base station obtained from the LUT as an approximate location of the mobile station; and determine an uncertainty associated with the approximate location of the mobile station based on a radius of a coverage area of the base station.

12. The article of claim 9, wherein the location of the base station comprises latitude and longitude of the base station.

13. A mobile station, comprising:

means for detecting an instruction to execute a location determination application originating from another mobile station;

means for obtaining a pilot signal comprising identification information associated with a base station;

means for extracting identification information of the base station from the pilot signal in response to detecting the instruction;

means for obtaining a location of the base station from a look-up table (LUT) stored in a memory of the mobile station using the identification information of the base station, wherein the LUT includes information about identification of a plurality of base stations and their corresponding locations in a region; and means for determining a location fix for the mobile station based on the location of the base station obtained from the LUT.

14. The mobile station of claim 13, wherein the identification information comprises at least one of a pilot pseudo-random noise sequence, a system identification, or a network identification.

15. The mobile station of claim 13, wherein the means for determining the approximate position of the mobile station comprises:

means for designating the location of the base station obtained from the LUT as an approximate location of the mobile station; and means for determining an uncertainty associated with the approximate location of the mobile station based on a radius of a coverage area of the base station.

16. The mobile station of claim 13, wherein the location of the base station comprises latitude and longitude of the base station.

* * * * *